US009051502B2

(12) United States Patent
Sedarous et al.

(10) Patent No.: US 9,051,502 B2
(45) Date of Patent: Jun. 9, 2015

(54) NANOFLUIDS FOR USE IN COOLING ELECTRONICS

(75) Inventors: Salah S. Sedarous, Rochester, MN (US); Chad D. Attlesey, Rochester, MN (US)

(73) Assignee: LIQUIDCOOL SOLUTIONS, INC., Rochester, MN (US)

( * ) Notice: Subject to any disclaimer, the term of this patent is extended or adjusted under 35 U.S.C. 154(b) by 509 days.

(21) Appl. No.: 13/356,938

(22) Filed: Jan. 24, 2012

(65) Prior Publication Data

US 2012/0186789 A1    Jul. 26, 2012

Related U.S. Application Data

(60) Provisional application No. 61/437,741, filed on Jan. 31, 2011, provisional application No. 61/451,761, filed on Mar. 11, 2011.

(51) Int. Cl.
*C09K 5/20* (2006.01)
*C09K 5/10* (2006.01)
*B82Y 30/00* (2011.01)
*F28D 15/00* (2006.01)
*F28D 21/00* (2006.01)

(52) U.S. Cl.
CPC . *C09K 5/10* (2013.01); *B82Y 30/00* (2013.01); *F28D 15/00* (2013.01); *F28D 2021/0028* (2013.01)

(58) Field of Classification Search
None
See application file for complete search history.

(56) References Cited

U.S. PATENT DOCUMENTS

| | | | |
|---|---|---|---|
| 6,165,380 A | 12/2000 | Ilves et al. | |
| 6,330,259 B1 | 12/2001 | Dahm | |
| 7,492,594 B2 | 2/2009 | Pal | |
| 2004/0069454 A1* | 4/2004 | Bonsignore et al. | 165/104.15 |
| 2004/0206941 A1* | 10/2004 | Gurin | 252/500 |
| 2004/0209782 A1 | 10/2004 | Zhang et al. | |
| 2005/0151114 A1* | 7/2005 | Davidson et al. | 252/73 |
| 2008/0272331 A1* | 11/2008 | Mohapatra et al. | 252/70 |
| 2009/0040716 A1 | 2/2009 | Fedorov | |
| 2009/0216292 A1 | 8/2009 | Pless et al. | |

(Continued)

FOREIGN PATENT DOCUMENTS

| | | |
|---|---|---|
| WO | 2008/133594 | 11/2008 |
| WO | 2010/085802 | 7/2010 |

OTHER PUBLICATIONS

S.S. Botha et al., "Physicochemical Properties of Oil-Based Nanofluids Containing Hybrid Structures of Silver Nanoparticles Supported on Silica," Ind. Eng. Chem. Res. (2011) vol. 50, p. 3071-3077.

(Continued)

*Primary Examiner* — Necholus Ogden, Jr.
(74) *Attorney, Agent, or Firm* — Hamre, Schumann, Mueller & Larson, P.C.

(57) ABSTRACT

A fluid composition or nanofluid is described that includes a dielectric base fluid, a chemical dispersant, and nanoparticles dispersed in the dielectric fluid. The chemical dispersant is used to facilitate the nanoparticle dispersing process and also to increase the stability of the nanofluid thus produced. The nanofluid is compatible with electronics and has enhanced thermal conductivity for use in cooling electronics. Techniques are described that can be used to efficiently disperse different forms of nanoparticles into a base fluid and produce a stable nanofluid which is compatible with electronic circuitry and components.

9 Claims, 3 Drawing Sheets

(56) References Cited

U.S. PATENT DOCUMENTS

| | | |
|---|---|---|
| 2009/0260777 A1 | 10/2009 | Attlesey |
| 2010/0259259 A1 | 10/2010 | Zahn et al. |

OTHER PUBLICATIONS

J. Buongiorno et al., "A benchmark study on the thermal conductivity of nanofluids," J. Appl. Phys. (2009) vol. 106, 094312, 14 pages.

S.U.S. Choi et al., "Anomalous thermal conductivity enhancement in nanotube suspensions," Appl. Phys. Lett. (2001), vol. 79, No. 14, p. 2252-2254.

C. Choi et al., "Preparation and heat transfer properties of nanoparticle-in-transformer oil dispersions as advanced energy-efficient coolants," Curr. Appl. Phys. (2008) vol. 8, p. 710-712.

J.A. Eastman et al., "Enhanced Thermal Conductivity through the Development of Nanofluids," Mat. Res. Soc. Symp. Proc. vol. 457 (1997), p. 3-11.

Y. Hwang et al., "Thermal conductivity and lubrication characteristics of nanofluids," Curr. Appl. Phys. (2006) vol. 6S1, p. e67-e71.

J. Lee et al., "A Review of Thermal Conductivity Data, Mechanisms and Models for Nanofluids," International Journal of Micro-Nano Scale Transport (2010) vol. 1, No. 4, p. 269-322.

M. Liu et al., "Enhancement of thermal conductivity with carbon nanotube for nanofluids," International Communication in Heat and Mass Transfer (2005) vol. 32, p. 1202-1210.

S.M.S. Murshed et al., "Investigations of thermal conductivity and viscosity of nanofluids," International Journal of Thermal Sciences (2008) vol. 47, p. 560-568.

J. Taha-Tijerina et al., "Electrically Insulating Thermal Nano-Oils Using 2D Fillers," ACS Nano (2012) vol. 6, No. 2, p. 1214-1220.

X. Wang et al., "Thermal Conductivity of Nanoparticle-Fluid Mixture," J. Thermophys. Heat Trans. (1999) vol. 13, No. 4, p. 474-480.

Y. Xuan and Q. Li, "Heat transfer enhancement of nanofluids," Int. J. Heat Fluid (2000), vol. 21, p. 58-64.

"Nanofluid for Cooling Enhancement of Electrical Power Equipment," Vanderbilt University, Office of Technology Transfer and Enterprise Development (possibly dated Oct. 31, 2009), 3 pages.

C. Chai, "Scientists Use Nanoparticle Fillers to Enhance Transformer Oil Efficiency," located online at http://www.azonano.com/news.aspx?newsID_24203, Feb. 4, 2012, 2 pages.

H. Xie et al., "Nanofluids containing multiwalled carbon nanotubes and their enhanced thermal conductivities," J. Appl. Phys., Oct. 2003, vol. 94, No. 8, p. 4967-4971.

Y. Hwang et al., "Thermal conductivity and lubrication characteristics of nanofluids," Current Appl. Phys., Mar. 2006, vol. 651, No. 1, p. e67-e71.

S. Shaikh et al., "Thermal conductivity improvement in carbon nanoparticle doped PAO oil: An experimental study," J. Appl. Phys., Mar. 2007, vol. 101, No. 6, p. 064302 (8 pages).

Y. Li et al., "Investigation on two abnormal phenomena about thermal conductivity enhancement of GN/EG nanofluids," Nanoscale Res. Lett., Jul. 2011, vol. 6, No. 1, p. 443 (7 pages).

International Search Report for international application No. PCT/US2012/023208, dated Dec. 14, 2012 (6 pages).

Written Opinion of the International Searching Authority for international application No. PCT/US2012/023208, dated Dec. 14, 2012 (10 pages).

\* cited by examiner

NANOFLUIDS FOR USE IN COOLING ELECTRONICS

CROSS REFERENCE TO RELATED APPLICATIONS

This application claims the benefit of U.S. Provisional Application 61/437,741 filed Jan. 31, 2011 and U.S. Provisional Application 61/451,761 filed Mar. 11, 2011, which applications are incorporated by reference herein in their entirety.

TECHNICAL FIELD

Fluids of enhanced thermal conductivity are prepared by dispersing nanomaterial(s) of high thermal conductivity into a dielectric base fluid to be used in a number of applications, for example cooling of electronics. Dispersion can be achieved by, for example, using physical or chemical techniques. Methods and fluid compositions are described that exhibit improved thermal conductivity due to the dispersion of the nanomaterial(s) in the dielectric fluid. The stability of the nanofluid is a function of, for example, concentration and formulation, but the long-term stability of the nanofluid will ultimately depend on the operating environment.

BACKGROUND

Cooling of modern electronics is becoming a major technical challenge due to the advancements in the design of faster and smaller electric components. As a result, different cooling technologies are being developed to effectively remove heat from these components. The use of liquid coolants has become an attractive alternative to air due to their material densities and high heat transfer coefficients which allows the removal of more heat. Coolants can be used in both single phase and two-phase formats.

Liquid submersion technology (LST) is one of the most promising and innovative methods for cooling computers such as desktop and server computers. LST utilizes dielectric liquid as a coolant medium instead of air.

Efficient cooling of electronics can help extend their operational lifetime. Keeping electronics at low temperatures allows operation at a higher speed (overclocking of CPU for example) since it is easier to remove the extra generated heat in the circuit by their contact with the flowing coolants. Moreover, heat extracted from electronic equipment in large data centers using LST can be recycled for later use in other heating applications, thus reducing their operational cost and negative impact on the environment. The capacity for recovering more heat by the LST technique could also be augmented by further increase of the thermal conductivity of fluids.

One of the promising methods of enhancing thermal conductivity of a fluid is to disperse into the fluid nanomaterial made of substances of relatively high thermal conductivities. Based on the predictions of the Mean Field Theory, one would expect the thermal conductivity of the new hybrid fluid to be higher than the base fluid alone.

Coolants of various types are used in equipment and in manufacturing processes to remove waste heat with water being the most efficient element due to its high thermal conductivity and heat capacity. In many applications water is not suitable and hence oil is used instead. Various types of natural or synthesized oils are used such as soy oil, mineral oil, polyalphaolefin, ester synthetic oil, and synthetic fluorinated oil. The value of the thermal conductivity of these oils is between 0.1-0.17 W/m-K at room temperature which is much lower than the 0.61 W/m-K of water.

Carbon nanotubes are a known thermally conductive material. Carbon nanotubes are macromolecules of the shape of a long thin cylinder and thus with high aspect ratio. There are two main types of carbon nanotubes: single-walled nanotubes ("SWNT") and multi-walled nanotubes ("MWNT"). The structure of a single-walled carbon nanotube can be described as a single graphene sheet rolled into a seamless cylinder whose ends are either open or capped by either half fullerenes or more complex structures including pentagons. Multi-walled carbon nanotubes comprise an array of such nanotubes that are concentrically nested like rings of a tree trunk with a typical distance of approximately 0.34 nm between layers.

Basic research over the past decade has shown that carbon nanotubes could have a thermal conductivity of an order of magnitude higher than copper—3,000 W/m-K for MWNT and 6,000 W/m-K for SWNT. Therefore, the thermal conductivities of nanofluids containing nanoparticles is expected to be significantly higher than the conventional fluids alone. Experimental results have demonstrated that a carbon nanotube suspension showed the highest thermal conductivity enhancement—a 150% increase in conductivity of oil at about 1% by volume of multi-walled carbon nanotubes (Choi, et al., App. Phys. Lett, 2001, 79(14), 2252).

Despite the extraordinary thermal properties of carbon nanotube suspensions, it is not easy to produce a nanoparticle suspension with a sustainable stability and consistent thermal properties. Due to the hydrophobic nature of graphitic structures, carbon nanotubes are not soluble in any known solvent. They also have a very high tendency to form aggregates and extended structures of linked nanoparticles, thus leading to phase separation, poor dispersion within a matrix, and poor adhesion to the host. However, stability of the nanoparticle suspension is important for practical industrial applications. Otherwise, the thermal properties of a nanofluid, such as thermal conductivity, will constantly change as the solid particles gradually separate from the fluid.

The superior thermal conductivity of carbon nanotubes and their derivatives has been recognized for a long time, but their use in cooling of electronics has not been extensively tested due to the high electric conductivity of carbon. One reason for this is the potential interaction of carbon clusters with electric circuits if their concentrations reach critical level. This condition can be avoided if the concentration of the nanomaterial is kept well below the percolation threshold. Additionally, one might expect that the dielectric breakdown voltage of the fluid will become smaller with the addition of the nanomaterial thus leading to circuit breakdown.

SUMMARY

A fluid composition or nanofluid is described that includes a dielectric base fluid, a chemical dispersant, and nanoparticles dispersed in the dielectric fluid. The chemical dispersant is used to facilitate the nanoparticle dispersing process and also to increase the stability of the nanofluid thus produced. The nanofluid is compatible with electronics and has enhanced thermal conductivity for use in cooling electronics. Techniques are described that can be used to efficiently disperse different forms of nanoparticles, including but not limited to carbon nanotubes, into a base fluid and produce a stable nanofluid which is compatible with electronic circuitry and components.

A chemical dispersant, dispersing agent, or the like as used herein is a material that facilitates dispersion and stability of the nanomaterials in the base fluid. Dispersion can be caused by wetting/hydrophobic/surfactant chemical components that modify the surfaces of the nanomaterial so that the nanomaterials stay suspended as long as possible in the base fluid.

The term nanomaterial, nanoparticles, or the like as used herein refers to materials that have a particle size in the range of 1-100 nm in at least one of 3 spatial dimensions.

The term nanofluid as used herein refers to fluids, preferably dielectric fluids, that contain suspended nanomaterials. The fluids can be liquids, and the liquids can be single phase or two-phase.

In this invention, dielectric fluids of enhanced thermal conductivity are prepared by dispersing carbon nanotubes, or other nanomaterials of selected thermal conductivity measured in W/m-K, into modified synthetic polyalphaolefin fluid. The resulting nanofluid can be used for cooling of submersed electronics and computer servers or for other cooling applications. Dispersion of the nanomaterials throughout the selected dielectric fluid is achieved by physical and/or chemical treatments to yield a fluid composition of enhanced thermal conductivity as compared to the base dielectric fluid alone.

In one example, a fluid composition with enhanced thermal conductivity for cooling electronics includes a dielectric base fluid having a predetermined thermal conductivity, about 0.001 to about 1 percent by weight of a nanomaterial having a thermal conductivity greater than the predetermined thermal conductivity of the dielectric base fluid and having an aspect ratio of 500-2000 dispersed into the dielectric base fluid, and a chemical dispersing agent.

In another example, a thermally enhanced fluid composition includes a dielectric base fluid having a predetermined thermal conductivity, and up to about 1 percent by weight of a nanomaterial dispersed within the dielectric base fluid. The nanomaterial has an aspect ratio from 500-20000, and the nanomaterial has a thermal conductivity greater than the predetermined thermal conductivity of the dielectric base fluid. The fluid composition also includes a chemical wetting agent. The resulting fluid composition has an electric breakdown field that renders the fluid composition suitable for direct contact with electronic components.

In some applications, where the main function of coolants is to lubricate moving parts in a machine, adding a small amount of graphite solids can enhance both the lubrication and cooling functions. The size of the graphite materials are small enough (nano-scale) to keep them suspended at all-times, thereby avoiding a compromise in mechanical performance.

DRAWINGS

DETAILED DESCRIPTION

Figure 1:
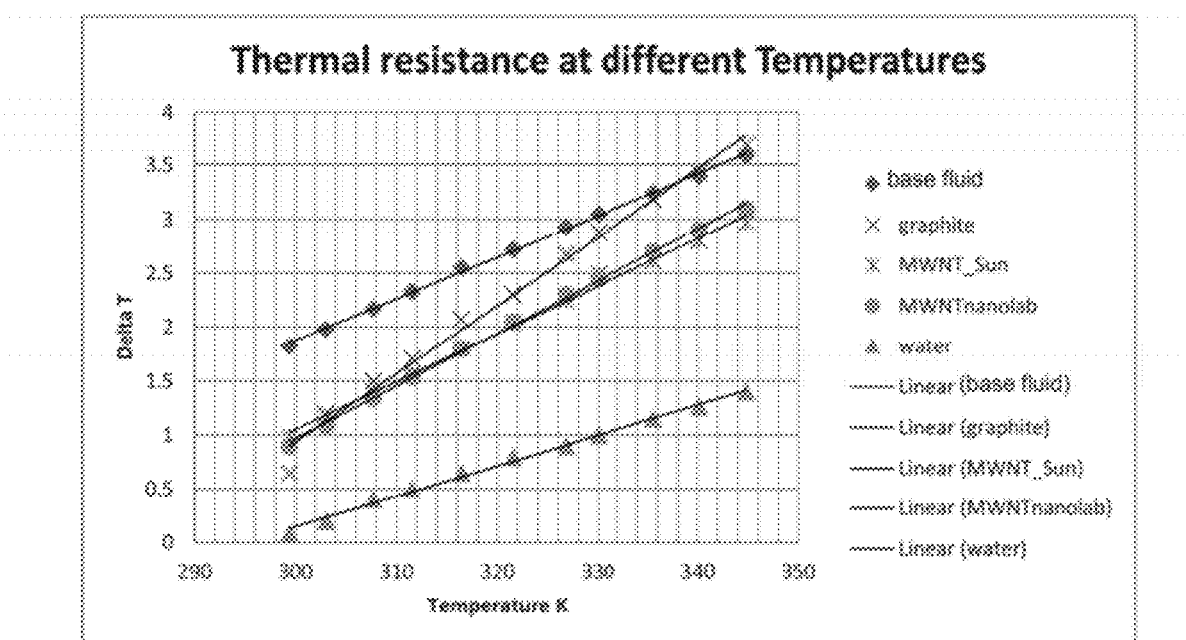
FIG. 1 is chart illustrating the thermal resistance data of a base fluid, water and different nanofluids at different temperatures.

Methods are described herein for enhancing thermal conductivity of dielectric fluid using nanomaterial. The resulting nanofluid can be used to cool electronics, for example in direct cooling applications including but not limited to liquid submersion cooling or spray cooling, or indirect cooling applications including but not limited to directing the nanofluid through a heat transfer plate that is in heat exchange relationship with the electronics. Specific cooling applications of the nanofluid include, but are not limited to, cooling in a data center, a server computer, a desktop computer, a telecommunications switch, a laser, an amplifier, or a vehicle. The nanofluid can also be used in many other cooling applications in place of conventional cooling fluids.

The physical and chemical properties of carbon nanotubes depend on methods of their preparation; therefore, no universal method for their suspension exists. The high aspect ratio of nanotubes coupled with a strong intrinsic van der Waals attraction force between their surfaces have a tendency to produce ropes of hexagonal lattice of SWNT or bundles of non-crystalline MWNT. With the aid of ultra-sonication, some nanotubes can be moderately dispersed in some solvents, e.g., in dimethylformamide and dichlorobenzene, to produce nanotube suspensions. Once dispersed, the nanotubes can then be transferred into the base fluid to produce the final nanofluid.

Preparation of stable nanofluids is important for their successful uses in heat transfer applications. The stability of nanofluids includes several parameters: 1) kinetic stability: nanoparticles dispersed in the nanofluids have strong Brownian movements which could offset their tendency for sedimentation by gravity; 2) dispersion stability: due to aggregation of nanoparticles, the dispersion of the nanoparticles in fluids may deteriorate with time; 3) chemical stability: no chemical reactions between the suspended nanoparticles or between nanoparticles and the base fluid are desired during the working conditions of the nanofluids.

In a stationary state, the sedimentation velocity of small spherical particles in liquid follows the Stock law:

$$V = \frac{2R^2}{9\mu}(\rho_P - \rho_L) \cdot g$$

where V is the sedimentation velocity of particles; R is the radius of spherical particles; $\mu$ is the viscosity of the base fluid medium, $\rho_P$ and $\rho_L$ are the density of the particles and the base fluid, respectively, and g is gravity.

This equation reflects the balance of gravity, buoyant force, and frictional force that are acting on the suspended nanoparticles. According to the above equation, the stability of the nanofluids is enhanced by: 1) reducing the size R of the nanoparticles; 2) increasing the viscosity $\mu$ of the base fluid; and 3) minimizing the density difference ($\rho_P - \rho_L$) between the nanoparticles and the base fluid.

The above equation also indicates that the sedimentation velocity is very sensitive to particle size; V is proportional to square R. At critical size Rc the sedimentation will "stop" when equilibrium is established between sedimentation and Brownian motion of the nanoparticles (diffusion). On the other end, at small sizes, the surface energy of the nanoparticles becomes high and therefore increases the possibility of aggregation. The challenge is to use smaller nanoparticles while modifying their surface energy to prevent aggregation.

Preparation Methods

There are several generic chemical and physical methods for making nanofluids described herein. One method involves the dispersion of synthesized vapor phase nanoparticles directly into the base fluid. Another method involves an initial synthesis of the nanoparticles followed by their dispersion in the base fluid using ultrasonic agitation.

The chemical method for making nanofluids involves chemical formulation of the nanomaterial with added chemical agents or surfactants. Hydrophobic nanotubes can be wetted first before dispersion into the base fluid. The goal is to provide either electro-repulsive forces or steric hindrance that keeps the suspension from agglomerations. Moreover, the final nanofluid may also contain an amount of one or more chemical compounds such as antioxidant agents, friction reducing agents, and/or detergents that not only enhance dispersion but to provide long operational time, stable viscosity.

A suitable dielectric based fluid for forming the nanofluid can be obtained from DSI Fluids of Tyler, Tex.

Many different types of nanomaterial can be used. Examples of nanomaterials include, but are not limited to, carbon-based nanomaterials or oxides. Specific examples of nanomaterials include, but are not limited to, single- or multi-walled carbon nanotubes; graphite; single layer (graphene) or multilayer regular or white hexagonal boron nitride (hBN); and nanodiamonds.

In the case of carbon nanotubes, the diameter of the nanotubes can be around 3-10 nm, and their length can range from submicron to a few microns. For example, the length can be from 2-20 microns. The aspect ratio (length/diameter) can be from around a few hundreds to a few thousands. Suitable short multiwall carbon nanotubes are available from either Nano-lab, Inc. of Waltham, Mass. or from Sun Innovations, Inc. of Fremont, Calif., and can be used without further purifications.

In the case of graphite, the graphite can be of large thickness, or few layers of hexagonal shape lattice. For example, in one example, a graphite nanoplatelet (xGnP) used can be formed from around 10 layers of graphene. Suitable graphite nanomaterials can be obtained from Asbury Graphite Mills, Inc. of Asbury, N.J.

Another layered nanomaterial with high thermal conductivity that can be used is hexagonal Boron Nitride (hBN) which is also electrically insulative. Suitable hBN can be obtained from Lower Friction of Ontario, Canada.

In the case of carbon nanodiamonds, the nanodiamonds can be spherical shaped of about 3-5 nanometers. The surface properties of the nanodiamonds can be tuned using different chemical modification. The nanodiamonds are also electrically insulative. Suitable nanodiamonds can be obtained from SkySpring Nanomaterial, Inc. of Houston, Tex.

Testing

The thermal conductivity of a dispersion of nanomaterial in dielectric fluid was tested. The known thermal conductivities of base fluid (poor thermal conductor) and of water (excellent thermal conductor) were used as references for determining the final thermal conductivity of the new nanofluids.

The following bullets and table 1 summarizes some of the physical properties of the dispersed materials that were tested:
1. Carbon nanotubes, multiwalled, hollow structure
2. Short MWNT SN-6578943 with bulk density of 0.48 g/cm3
3. Synthetic graphite powder (4827-Asbury Mills) with a mean particle size of 3
4. Graphite nanoplatelets of 5 um thickness
5. Hexagonal Boron Nitride of 70 um thickness
6. Nanodiamonds of 3-5 nm diameter

TABLE 1

| Nano-material | Purity (%) | Inside Diameter (nm) | Outside Diameter (nm) | Length/thickness (um) | Specific surface area (m2/g) |
|---|---|---|---|---|---|
| MWNT-nano-Long | 95 | 2-7 nm | 15 ± 5 | 1-5 um | 200-400 |
| MWNT_Sun Short | 95 | 2-5 | >10 | 1-2 um | 40-300 |
| Graphite | 95 | Synthetic Powder 3 um | N/A | 3 um thickness | 200 |
| xGnP-M-5 | 99.5 | Nanoplatelets | 5 um | 6-8 nm thickness | 120-150 |
| Hex BN | | nanoflakes | N/A | 70 nm | |
| Nanodiamonds | 95 | 3 | 5 | N/A | 260 |

Dispersion of Nanomaterial in the Dielectric Liquid

There are a variety of common dispersant chemicals in the market for dissolving different types of materials, such as in the automotive and detergents. These chemicals can also be used to aid in dispersion of the nanoparticles. For example, chemicals used for dissolving carbon debris in gasoline engines can be used with little or no modifications. Another source of wetting agent can be those used in oil painting for wetting dry hydrophobic pigments. A combination of wetting chemicals and nonionic surfactant can also be used with the different carbon nanomaterials to enhance the dispersion and the stability of the new dielectric nanofluid.

The wetting agents can be made from slow or fast evaporating substances depending on the specific application. If wetting materials are added to the base dielectric fluid, the wetting material should be allowed to evaporate without altering the chemical composition of the base fluid. The wetting material and dispersant surfactants, if both are used, should also be highly miscible in the base fluid.

The physical properties of the base fluid obtained from DSI Fluids is provided in Table 2.

TABLE 2

| Temperature C. | Kinematic Viscosity cSt | Dynamic Viscosity Poise | Heat Capacity J/Kg-C. | Thermal Conductivity W/m-C. | Density kg/m^3 | Specific Volume m^3/kg | Coefficient of Thermal Expansion (CTE) |
|---|---|---|---|---|---|---|---|
| 0 | 6.95 | 0.059 | 2055.00 | 0.1370 | 851.582 | 1.174E−03 | 0.00068 |
| 10 | | | 2092.70 | 0.1364 | 845.751 | 1.182E−03 | 0.00068 |
| 20 | 4.77 | 0.040 | 2130.40 | 0.1358 | 840.000 | 1.190E−03 | 0.00068 |
| 30 | | | 2168.10 | 0.1352 | 834.327 | 1.199E−03 | 0.00068 |
| 40 | 3.5 | 0.029 | 2205.80 | 0.1346 | 828.729 | 1.207E−03 | 0.00068 |
| 50 | | | 2243.50 | 0.1341 | 823.207 | 1.215E−03 | 0.00068 |
| 60 | 2.7 | 0.022 | 2281.20 | 0.1335 | 817.757 | 1.223E−03 | 0.00068 |
| 70 | | | 2318.90 | 0.1329 | 812.379 | 1.231E−03 | 0.00068 |
| 80 | 2.17 | 0.018 | 2356.60 | 0.1323 | 807.071 | 1.239E−03 | 0.00068 |

TABLE 2-continued

| Temperature C. | Kinematic Viscosity cSt | Dynamic Viscosity Poise | Heat Capacity J/Kg-C. | Thermal Conductivity W/m-C. | Density kg/m³ | Specific Volume m³/kg | Coefficient of Thermal Expansion (CTE) |
|---|---|---|---|---|---|---|---|
| 90 | | | 2394.30 | 0.1317 | 801.833 | 1.247E−03 | 0.00068 |
| 100 | 1.8 | 0.014 | 2432.00 | 0.1311 | 796.662 | 1.255E−03 | 0.00068 |

Physical Techniques of Dispersing Nanomaterial

An ultrasound technique was used for physical mixing of the nanomaterial into the base fluid. The materials were mixed using either a bath-type or a probe tip ultra-sonicator. A homogeneous mixture was obtained after one hour of mixing using a low power bath sonicator system. This time could be reduced when using longer nanotubes since high sonic energy can damage their structural integrity and reduce their thermal performances. In this case a low power bath sonicator is more than adequate. The nanotubes that were used were relatively small enough and therefore unlikely to be damaged by long time exposure to low or high powered sonication.

EXAMPLES

The previous and following specific compositions, methods, and embodiments are intended to illustrate the inventive concepts and are not to be construed as limiting the invention which is defined by the claims. Variation of these compositions, methods and embodiments are possible.

Example 1

Long Multiwalled Carbon Nanotubes in Dielectric Base Fluid

Example 2

Short Multiwalled Carbon Nanotubes in Dielectric Base Fluid

Example 3

Graphite Nanoparticles in Dielectric Base Fluid

To suspend the nanomaterial in the dielectric base fluids, a Virsonic 600 Ultrasonic tip-sonicator was used. We suspended 61.77 mg of MWNT (MWNT nano) in 300 ml of the base fluid. The MWNT nano in the base fluid was exposed to 20 minutes of 7 watts ultrasound energy from a probe sonicator. The sonication energy was delivered into the samples at on/off cycles using 20/10 seconds duration.

In order to further enhance the suspension of the nanomaterials, a few drops (about 2-5 ml) of dry ethanol was added to the base fluid during sonication. The ultrasound process was repeated two more times for better distribution of the material in the base fluid. The final suspension solution of the MWNT nano was around 0.025% by weight.

The same procedure was repeated for the short MWNT nanomaterial (about 51.65 mg of nanomaterials was added to about 300 ml of base fluid, together with the ethanol addition, to make a concentrated solution of about 0.021% by weight) and the graphite nanoparticles (about 320 mg of graphite was dispersed into about 300 ml of base fluid together with the ethanol addition). The final graphite solution was around 0.13% solution by weight.

Most of the materials stayed in suspension with little sign of settlement. Some settled residues are either due to un-dissolved materials or due to the presence of 5% of carbon ash contamination. All un-dissolved materials should be removed, for example using a cellulose filter, before using the nanofluid with electronics.

Overtime, some sedimentation of the nanomaterial occurred when the nanofluids were left at room temperature. However, the nanofluid preparations were stable for more than two months on shelves and without the aid of any mechanical agitation.

Measurement of Thermal Conductivity

Thermal conductivity was measured using a system that measures heat propagation along the length of a test tube filled with a given fluid. The test tube was surrounded by thermal insulation along the length of the tube, the top was exposed to room temperature and the bottom was in contact with a thermal bath. Data was collected using a transient method in which the temperature of the fluid is recorded over time during heating from the bottom side which was in contact with a large water thermal bath. Every time the bath temperature was changed, the system was allowed to reach equilibrium before changing the bath temperature to a higher value. The equilibrium values were used to calculate thermal conductivity. In addition, thermal simulation of the system was performed to make predictions of the expected temperature rises and the time it takes for the system to reach equilibrium.

The heat transfer flux along the Z-length of the test tube is given by $Q/A=-k\, dT/dz$, where $Q/A$ is the heat flux; $k$ is thermal conductivity; and $A$ is the cross sectional area of the test tube, and $dT/dz$ is the thermal gradient along the z-coordinate.

Also, $Q_z = kA/L\, (T_{bath} - T_{sample})$, where $kA/L$ is thermal conductance (or the reciprocal of the thermal conductance $L/kA$ is the thermal resistance).

$$\text{Delta } T = T_{bath} - T_{sample} = L/kA * Q$$

At equilibrium, for samples of the same heights, the temperature at the midpoint of the fluid is proportional to the heat flux from the hot water bath to the fluid inside of the test tube. The magnitude of the temperature at the midpoint of the fluid is related to the thermal conductance of the sample height as measured from the bottom of the tube to the midpoint (location of the thermocouple). While the speed of the temperature rise is proportional to the diffusivity of the fluid, the steady state temperature value is proportional to the thermal conductivity of fluid. The higher the thermal conductivity of the fluid, the closer the final temperature is to the temperature of the heating water bath.

A sample of the fluid was placed in a test tube which is insulated from all sides except from the bottom (in contact with the water bath heat source) and the top (exposed to room temperature). Heat flows along the cylinder through the sample into air with a heat gradient from water bath to room temperature. The diameter and length of the test tube used were about 0.015 m and about 0.16 m, respectively. A 0.06 m long sample was chosen and a long thermocouple from Omega Engineering Inc., (OMEGA Engineering INC.; Connecticut USA) was placed at about 3 cm above the base of the test tube to measure $T_{Sample}$ at half the fluid's height. Another thermocouple was placed outside the insulating test tube and located at the bottom side to measure $T_{Bath}$. The entire system was lowered into a water bath of around 15 liters volume. The water bath was heated by a 1000 watts Cole-Parmer® Polystat® Immersion Circulator from the Cole-Parmer Instrument Company of Vernon Hills, Ill.

The output of the thermocouple was connected to a NI USB-9211A data acquisition module system available from National Instruments Corporation of Austin, Tex., and the recorded data was stored and displayed.

The thermal bath was heated and the temperature of the sample was recorded every 500 ms. Data was collected continuously and the sample's temperatures were allowed to reach equilibrium with the external heating bath. The heat flows from the water bath into the sample and from the sample into room temperature. The thermal conductance of the sample, which is the reciprocal of thermal resistance, is proportional to thermal conductivity.

Initially, the thermal conductivity of the dielectric base fluid alone was measured. The thermal conductivity of the dielectric fluid with the dispersed long and short MWNT of carbon and graphite nanomaterial were also measured. In addition, the thermal conductivities of a water sample of the same height were also measured and used as a reference. These measurements were performed at different temperatures from about 25 C to about 80 C. Temperature differences between the water bath and the sample were plotted at different bath temperatures in order to calculate the thermal resistance or conductance at different temperatures.

FIG. 1 gives a summary of the thermal resistance ($T_{bath}$-$T_{sample}$) data of the different fluids at different temperatures. The data of FIG. 1 can be summarized as follows:
1. Thermal resistance of the base fluid is the highest among all samples
2. Thermal resistance of MWNT is lower than the base fluid alone
3. Thermal resistance of short and long MWNT are similar to each other
4. Thermal resistance of the graphite sample was slightly lower than the base fluid alone at lower temperature. However at high temperature, its thermal resistance is higher than that of the base fluid.
5. Thermal resistivity of water is lower than all fluids In summary, the thermal resistance of the nanofluids is clearly lower than that of the base fluid alone indicating that the nanofluids conduct heat more efficiently than the base fluid alone. Nonetheless, it is not as high in conducting heat as that of liquid water. The magnitude of thermal conductivity of the different nanofluid samples are somewhere between those of the base fluid and water.

Since we know that values of thermal conductivity of the different nanofluids are between water and the base fluid, the thermal conductivity values at different temperatures was calculated. The thermal conductivity of water and of dielectric fluids are known at all temperatures (see Table 2). The thermal conductivities of water at different temperature are also well known.

In order to calculate the thermal conductivity of the nanofluids, lines connecting the thermal conductance of water and the base fluid samples at different temperatures with the conductance is plotted on the y-axis and thermal conductivity on the x-axis. Thermal conductance is proportional to thermal conductivity, therefore water and dielectric fluid were used as a reference, and plot a line between the two values at each temperature. At each temperature, the projection of the thermal conductance of the nanofluid (the y-value) was projected onto the corresponding line between water and the base fluid to calculate its corresponding thermal conductivity value on the x-axis. These steps were repeated at different temperature to calculate thermal conductivities of the nanofluids.

Figure 2:
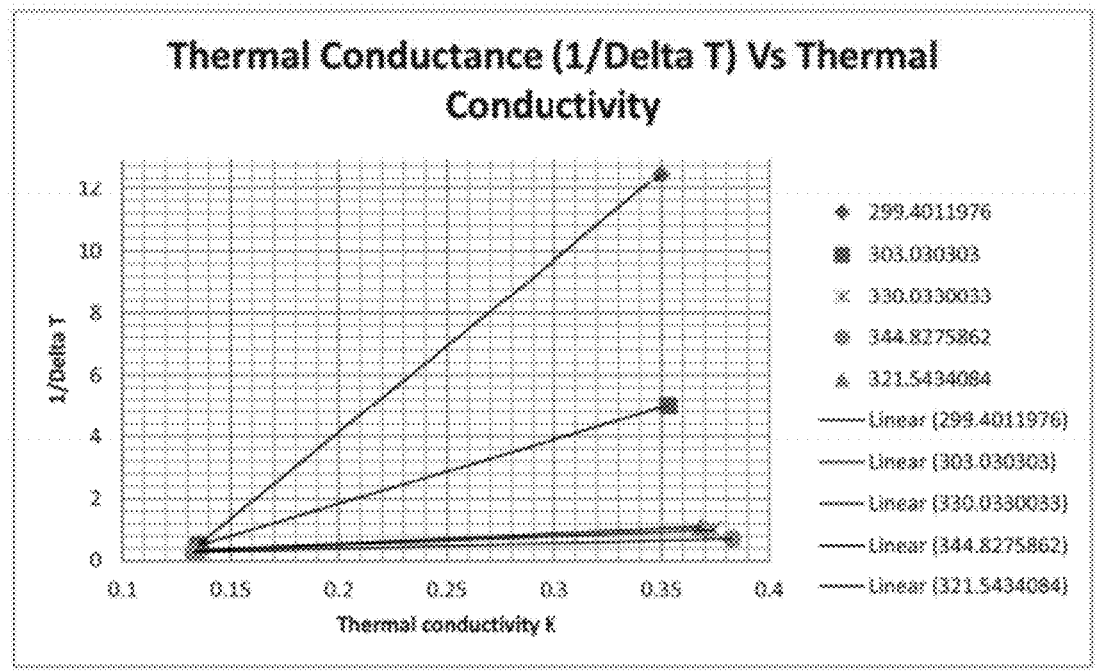
FIG. 2 is a chart illustrating the thermal conductance versus the thermal conductivity for the base fluid, water and different nanofluids.

FIG. 2 shows the lines connecting thermal conductance and thermal conductivity of water and the base fluid at different temperatures.

Table 3 includes a summary of the thermal conductance, the corresponding thermal conductivities, and the ratio of thermal conductivity of the nanofluid MWNT_nano over the base fluid. Similarly, thermal conductivity of other nanofluids can be calculated using this method.

TABLE 3

| Temperature (K) | Thermal (nanoI) | K (nano/base) | Knano/Kbase |
|---|---|---|---|
| 299 | 1.11 | 0.168 | 1.24 |
| 303 | 0.917 | 0.165 | 1.22 |
| 307 | 0.746 | 0.178 | 1.32 |
| 311 | 0.65 | 0.175 | 1.3 |
| 330 | 0.408 | 0.165 | 1.24 |
| 344 | 0.322 | 0.160 | 1.2 |

It is clear that a 0.02% w suspension of carbon MWNT in the base fluid increased the thermal conductivity by 20 to 30%. The thermal conductivity of the nanofluid is also correlated with the concentration of the suspended nanomaterial.

For the graphite sample, the increase of thermal resistance at high temperature can be attributed to the sedimentation of the nanomaterials which prevent the flow of heat due to the anisotropic thermal conductivity of graphite.

The thermal resistance of the nanofluid changes with the concentration of the dispersed materials. At higher concentration, it should increase towards the thermal conductivity of water, and at very low concentration should be close to the base fluid value.

Example 4

Graphite Nanoplatelets in Base Fluid

To disperse graphite nanoplatelets in the base fluid, about 200 mg of GNP-M-5 was slowly mixed in about 20-50 ml of the base fluid. The new suspension was sonicated for a few seconds using a probe tip sonication system. Eventually, the sample was slowly added to about a liter of the base fluid and exposed to further sonication. The sonication continued for total of about 30 minutes with about 20/10 seconds of on/off cycles. A very homogeneous and stable dark suspension was obtained at the end of sonication.

In another embodiment, a few milliliters (for example 10 ml per 1000 ml of base fluid) of 100% isopropanol was added directly to the dry nanoplatelets for wetting before sonication. The addition of the alcohol enhanced the dispersion and increased the stability of the resulting nanofluid. The observed enhancement of thermal conductivity of the nanofluid containing the graphite nanoplatelets was similar to the nanofluid containing carbon nanotubes.

Example 5 hBN in Base Fluid

About 120 milligrams of hBN of about 70 nm thickness was dissolved into a small sample (about 40-60 ml) of base fluid together with about 10 ml of isoproponal per 1000 ml of base fluid and slowly mixed in a glass beaker. Once the mix was homogeneous, the sample was sonicated using a tip probe sonicator for about 20 seconds followed by about a 10 second rest, and the sonication was repeated.

The sample was brownish in color and very well dispersed. The small sample was added to about one liter of base fluid. The resulting sample fluid was sonicated for about one hour with the sample exposed to on/off cycles of about 20/10 seconds.

At high concentration, the heat resistance was higher than that of the base fluid indicating lower thermal conductivity. At the end of the thermal measurement, white sedimentation was observed at the bottom of the test tube. By reducing the concentration of the sample by filtering out some of the sedimentation, the thermal conductivity improved.

Next, the sample was filtered using a micro-cellulose filter to remove any obvious sedimentation from the sample after one thermal cycle. This resulted in an increase in the thermal conductivity of the sample upon filtration.

Example 6

Nanodiamonds

Spherical shaped nanodiamonds of about 3-4 nanometers were tested due to their high thermal conductivity and for their electrical insulation. Like hBN, the nanodiamonds were dispersed into the base together with about 10 ml of isoproponal per 1000 ml of base fluid. However, the nanodiamonds could be dispersed into the base fluid without the use of isopropanol as a wetting agent if desired. The sample was then filtered to enhance the thermal conductivity.

Electrical Breakdown Measurements of Carbon Nanofluids

The nanofluid is designed to be useable in direct contact cooling of electronics, such as LST or spray cooling. Therefore, the breakdown voltage of the nanofluid needs to be sufficient.

Determining the breakdown voltage involves connecting two electrodes to a high voltage power source of 10-60 kV output. The electrodes were placed inside a container which was filled with the nanofluid under observation. The two electrodes were totally covered with the fluid to prevent electric arching in air. The distance between the electrodes were measured before applying external voltage. At a given separation distance, the voltage was turned on and increased until the first indication of electric discharge inside the nanofluid was observed. The same procedures were repeated at a larger distance and the new discharge voltage recorded.

Electric field breakdown voltage was calculated as the ratio of applied electrostatic voltage/separation distance of electrodes (V/d) and plotted as a function of the separation distance.

Figure 3:
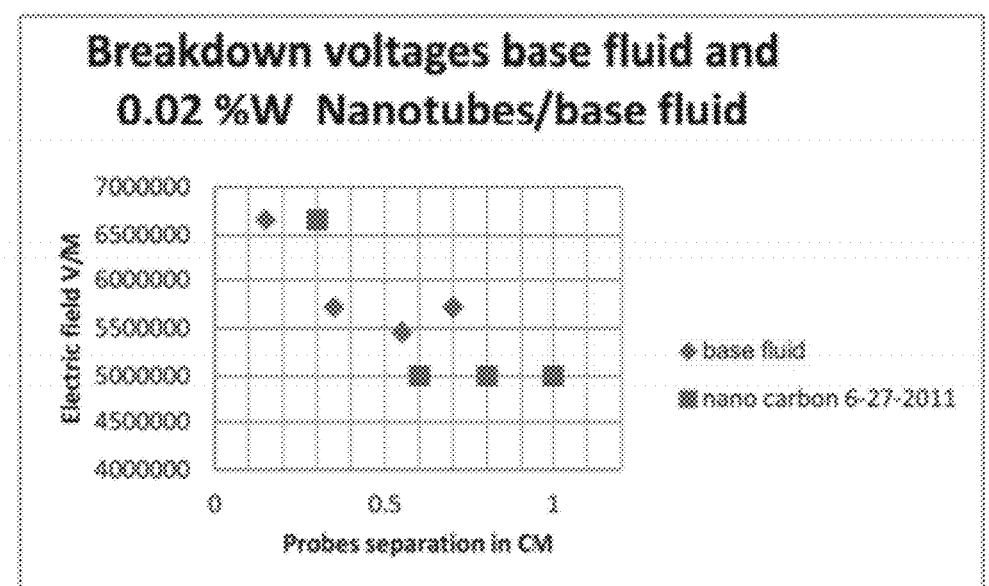
FIG. 3 is a chart illustrating the breakdown voltages of the base fluid and a selected one of the nanofluids.

FIG. 3 illustrates the breakdown electric field of the base fluid and the base fluid loaded with a 0.02% w carbon nanotubes suspension. It is clear that there is no significant difference between the breakdown voltages of the two samples. The breakdown field for the base fluid is around $5.5 \cdot 10^6$ v/m versus about $5.0 \cdot 10^6$ v/m for the nanofluid which is not much difference given the error of measuring v or d. The small rise at lower distance could be due to the variation in measuring d or other effect. The concentration used for making the nanofluid was less than 1% by weight and the sizes of the newly prepared nano-dispersion were always small and uniform. With aging, some micro clusters can form which can affect the electrical properties of the nanofluid.

It is believed to be important to use the smallest amount of dispersed nanomaterial that gives the highest thermal conductivity. For nanomaterial, the threshold of electric percolation which can lead to voltage breakdown depends on many factors besides concentration of the nanomaterial, such as aspect ratio, dispersion uniformity and dispersion sizes.

Beside carbon MWNT and graphite, other nanomaterials can be used to form a nanofluid for cooling electronics. Oxide materials such as $Al_2O_3$, $CuO$, $TiO_2$ are thermally conductive and electrical insulators, therefore could easily be adapted here with little modification.

Exemplary Applications

The observed substantial increases in the thermal conductivities of nanofluids permit broad industrial applications of the nanofluids. The enhanced heat transfer ability of the nanofluids can translate into high energy efficiency, better performance, and low operating costs of LST cooled computer data centers. The energy used to cool data centers consumes around 8% of the total electric consumption in the USA. Using LST with the enhanced nanofluids described herein would have an enormous impact on reducing energy consumption. An example of LST used in a server is disclosed in U.S. Pat. No. 7,905,106 which is incorporated by reference herein in its entirety.

Of the electric energy used in running computer chips, 98% is wasted into heat. Therefore, having an efficient nanofluid for extracting heat away from computer chips and other electronics will allow for the heat to be recycled and reused. The heat absorbed by the nanofluid can be recycled and reused using techniques known in the art.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fluid composition with enhanced thermal conductivity for cooling electronics, comprising:
    a dielectric base fluid having a predetermined thermal conductivity, the dielectric base fluid comprises polyalphaolefin with added anti-oxidant chemicals;
    about 0.001 to about 1 percent by weight of a non-electrically conductive nanomaterial having an aspect ratio of 500-2000 dispersed into the dielectric base fluid, the non-electrically conductive nanomaterial having a thermal conductivity greater than the predetermined thermal conductivity of the dielectric base fluid, and the non-electrically conductive nanomaterial comprises hexagonal boron nitride; and
    a chemical dispersing agent.

2. The fluid composition of claim 1, wherein the chemical dispersing agent is soluble in the dielectric base fluid.

3. The fluid composition of claim 1, wherein the chemical dispersing agent is a surfactant.

4. The fluid composition of claim 3, wherein the surfactant is a nonionic substance.

5. A thermally enhanced fluid composition, comprising:
    a dielectric base fluid having a predetermined thermal conductivity, the dielectric base fluid comprises polyalphaolefin with added anti-oxidant chemicals;
    0.001 about 1 percent by weight of a non-electrically conductive nanomaterial dispersed within the dielectric base fluid, the non-electrically conductive nanomaterial having an aspect ratio from 500-20000, and the non-electrically conductive nanomaterial having a thermal conductivity greater than the predetermined thermal conductivity of the dielectric base fluid, and the non-electrically conductive nanomaterial have surfaces that are modified by a chemical wetting agent, and the non-electrically conductive nanomaterial comprises hexagonal boron nitride; and the fluid composition has an electric breakdown field that renders the fluid composition suitable for direct contact with electronic components.

6. The thermally enhanced fluid composition of claim 5, wherein the non-electrically conductive nanomaterial is present in an amount from about 0.01 to about 1 percent by weight.

7. The thermally enhanced fluid composition of claim 5, wherein the non-electrically conductive nanomaterial has a thermal conductivity in the range between about 3000 to about 6000 w/m-k.

8. The thermally enhanced fluid composition of claim 5, wherein the dielectric base fluid has a viscosity of about 1.2 centistoke.

9. The thermally enhanced fluid composition of claim 5, wherein the electric breakdown field is $5.5 \times 10^6$ v/m or higher.

* * * * *